(12) United States Patent
Yin et al.

(10) Patent No.: US 10,996,477 B2
(45) Date of Patent: May 4, 2021

(54) VIRTUAL REALITY HEAD-MOUNTED APPARATUS

(71) Applicant: ADVANCED NEW TECHNOLOGIES CO., LTD., Grand Cayman (KY)

(72) Inventors: Huanmi Yin, Hangzhou (CN); Hong Zhang, Hangzhou (CN); Feng Lin, Hangzhou (CN); Jun Wu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/526,228

(22) Filed: Jul. 30, 2019

(65) Prior Publication Data
US 2019/0353909 A1 Nov. 21, 2019

Related U.S. Application Data

(63) Continuation of application No. PCT/CN2018/077281, filed on Feb. 26, 2018.

(30) Foreign Application Priority Data
Feb. 27, 2017 (CN) .......................... 201710108672.8

(51) Int. Cl.
*G09G 5/00* (2006.01)
*G02B 27/01* (2006.01)
(Continued)

(52) U.S. Cl.
CPC ..... *G02B 27/0172* (2013.01); *G02B 27/0093* (2013.01); *G02B 27/0176* (2013.01);
(Continued)

(58) Field of Classification Search
USPC ............ 345/8, 1.3, 156, 174, 426, 183, 158
See application file for complete search history.

(56) References Cited

U.S. PATENT DOCUMENTS

| 6,043,799 A | 3/2000 | Tidwell |
| 9,788,714 B2 | 10/2017 | Krueger |

(Continued)

FOREIGN PATENT DOCUMENTS

| CN | 102693437 A | 9/2012 |
| CN | 103293673 A | 9/2013 |

(Continued)

OTHER PUBLICATIONS

Search Report for European Application No. 18756597.3, dated Jan. 8, 2020, 4 pages.

(Continued)

*Primary Examiner* — Thuy N Pardo

(57) ABSTRACT

Methods, systems, and apparatus, including computer programs encoded on computer storage media, for a virtual reality (VR) head-mounted apparatus are provided. One of the apparatus includes: a first convex lens on a side of the apparatus close to a user's eye when the user wears the apparatus, a partial-reflection partial-transmission lens located in the apparatus and on a side of the first convex lens away from the user's eye; and a camera located between the first convex lens and the partial-reflection partial-transmission lens. The partial-reflection partial-transmission lens is positioned and configured to reflect infrared light from the user's eye to the camera. The VR head-mounted apparatus improves the acquisition accuracy of an infrared image of an eye of the user wearing the apparatus.

20 Claims, 4 Drawing Sheets

(51) Int. Cl.
*G02B 27/00* (2006.01)
*G06F 3/01* (2006.01)

(52) U.S. Cl.
CPC ...... *G06F 3/013* (2013.01); *G02B 2027/0138* (2013.01); *G02B 2027/0187* (2013.01)

(56) References Cited

U.S. PATENT DOCUMENTS

| | | | |
|---|---|---|---|
| 9,922,464 | B2 | 3/2018 | Haseltine et al. |
| 9,996,984 | B2 | 6/2018 | Haseltine et al. |
| 10,151,927 | B2 | 12/2018 | Magpuri et al. |
| 10,178,379 | B2 | 1/2019 | Wang et al. |
| 10,228,564 | B2 | 3/2019 | Haseltine |
| 10,300,372 | B2 | 5/2019 | Goslin et al. |
| 10,424,295 | B2 | 9/2019 | Haseltine et al. |
| 2010/0149073 | A1* | 6/2010 | Chaum ............... G02B 27/0172 345/8 |
| 2011/0169928 | A1 | 7/2011 | Gassel et al. |
| 2012/0206588 | A1 | 8/2012 | Kishigami et al. |
| 2012/0313839 | A1 | 12/2012 | Smithwick et al. |
| 2013/0208014 | A1 | 8/2013 | Fleck et al. |
| 2013/0222384 | A1* | 8/2013 | Futterer ............... G02B 6/0016 345/426 |
| 2015/0009236 | A1 | 1/2015 | Saito |
| 2015/0312560 | A1* | 10/2015 | Deering ............... A61F 2/1602 345/1.3 |
| 2015/0324568 | A1 | 11/2015 | Publicover et al. |
| 2016/0110883 | A1* | 4/2016 | Starner ............... G06K 9/00268 382/106 |
| 2016/0180591 | A1 | 6/2016 | Shiu et al. |
| 2016/0231577 | A1* | 8/2016 | MacK ............... G02B 27/0172 |
| 2016/0240013 | A1 | 8/2016 | Spitzer |
| 2016/0246055 | A1 | 8/2016 | Border et al. |
| 2016/0349509 | A1 | 12/2016 | Lanier et al. |
| 2016/0370591 | A1 | 12/2016 | Wilson et al. |
| 2016/0378176 | A1 | 12/2016 | Shiu et al. |
| 2017/0038834 | A1 | 2/2017 | Wilson et al. |
| 2017/0131765 | A1 | 5/2017 | Perek et al. |
| 2017/0140223 | A1* | 5/2017 | Wilson ............... G06K 9/00604 345/174 |
| 2017/0140224 | A1* | 5/2017 | Wilson ............... G02B 27/0093 314/8 |
| 2017/0186231 | A1* | 6/2017 | Petrov ............... G06F 3/013 345/156 |
| 2017/0219826 | A1 | 8/2017 | Haseltine et al. |
| 2017/0227764 | A1* | 8/2017 | Kim ............... G02B 27/141 |
| 2017/0257618 | A1 | 9/2017 | Haseltine et al. |
| 2017/0262703 | A1 | 9/2017 | Wilson et al. |
| 2017/0329398 | A1* | 11/2017 | Raffle ............... G02B 27/0093 345/8 |
| 2017/0340200 | A1* | 11/2017 | Blaha ............... A61B 3/113 |
| 2017/0358136 | A1* | 12/2017 | Gollier ............... G06F 1/163 |
| 2018/0096503 | A1 | 4/2018 | Kaehler et al. |
| 2019/0025583 | A1* | 1/2019 | Mullins ............... G02B 27/0955 |
| 2019/0079287 | A1* | 3/2019 | Kim ............... G02B 27/0103 |
| 2019/0113968 | A1 | 4/2019 | Huang et al. |
| 2019/0146198 | A1* | 5/2019 | Khan ............... G09G 3/003 345/8 |
| 2020/0073143 | A1* | 3/2020 | Macnamara ............... A61B 3/028 345/8 |

FOREIGN PATENT DOCUMENTS

| | | |
|---|---|---|
| CN | 104407440 A | 3/2015 |
| CN | 105068249 A | 11/2015 |
| CN | 205139485 U | 4/2016 |
| CN | 105718046 A | 6/2016 |
| CN | 105929543 A | 9/2016 |
| CN | 105955491 A | 9/2016 |
| CN | 205594581 U | 9/2016 |
| CN | 106214118 A | 12/2016 |
| CN | 106291930 A | 1/2017 |
| CN | 106406509 A | 2/2017 |
| CN | 106406543 A | 2/2017 |
| CN | 205942608 U | 2/2017 |
| CN | 106932904 A | 7/2017 |
| CN | 206573783 U | 10/2017 |
| DE | 202016104179 U1 | 8/2016 |
| JP | H8-205200 A | 8/1996 |
| JP | H11-249588 A | 9/1999 |
| JP | 2008-241822 A | 10/2008 |
| JP | 2015-15563 A | 1/2015 |
| KR | 10-2015-0027651 A | 3/2015 |
| WO | 2015198502 A1 | 12/2015 |
| WO | 2016018487 A2 | 2/2016 |
| WO | 2016157485 A1 | 10/2016 |
| WO | 2017079689 A1 | 5/2017 |
| WO | 2018067357 A2 | 4/2018 |

OTHER PUBLICATIONS

Examination Report for European Application No. 18756597.3, dated Jan. 24, 2020, 5 pages.
Written Opinion of Singaporean Application No. 11201907252P, dated Apr. 7, 2020, 10 pages.
Non-final rejection and Search Report for Taiwanese Application No. 106139874 dated Oct. 30, 2018 (8 pages).
Written Opinion of the International Searching Authority and International Search Report for PCT Application No. PCT/CN2018/077281 dated May 25, 2018 (16 pages).
International Preliminary Report on Patentability Chapter I for PCT Application No. PCT/CN2018/077281 dated Sep. 6, 2019 (11 pages).
First Search for Chinese Application No. 201710108672.8 dated Oct. 9, 2018 (1 page).
First Office Action for Chinese Application No. 201710108672.8 dated Oct. 17, 2018 (4 pages).
Second Office Action for Chinese Application No. 201710108672.8 dated Jun. 28, 2019 with English machine translation (13 pages).
Office Action for Japanese Application No. 2019-546272 dated Aug. 4, 2020.
Office Action for Korean Application No. 10-2019-7024389 dated Nov. 17, 2020.

* cited by examiner

VIRTUAL REALITY HEAD-MOUNTED APPARATUS

CROSS-REFERENCE TO RELATED APPLICATION

This application is a continuation application of International Patent Application No. PCT/CN2018/077281, filed on Feb. 26, 2018, which is based on and claims priority of the Chinese Patent Application No. 201710108672.8, filed on Feb. 27, 2017 and entitled "VIRTUAL REALITY HEAD-MOUNTED APPARATUS." The above-referenced applications are incorporated herein by reference in their entirety.

TECHNICAL FIELD

This application relates generally to virtual reality (VR) technology, and more specifically, to a VR head-mounted apparatus.

BACKGROUND

Virtual reality (VR) technology provides three-dimensional immersive scenes for a user by utilizing a computer graphics system and various control interfaces to generate an interactive environment on a computer. Existing techniques may create VR experience through a VR head-mounted apparatus, such as VR glasses or a VR helmet.

However, due to unique characteristics of VR technology, techniques that may work on traditional electronic devices, such as mobile phones or PCs, may not work well on a VR apparatus. For example, when acquiring an infrared image of an eye of a user wearing a VR apparatus, image acquisition conditions for conventional methods may be difficult to satisfy due to structural constraints within the VR apparatus, resulting in difficulties to successfully complete tasks such as biometric recognition, eye tracking, etc. Therefore, a VR apparatus that can quickly and accurately acquire an eye image is desired.

SUMMARY

In view of the limitations of existing techniques described above, this application provides a VR head-mounted apparatus. This apparatus may provide improved acquisition accuracy for an infrared image of an eye of a user wearing the VR apparatus.

A first aspect of this invention may direct to a VR head-mounted apparatus. The VR head-mounted apparatus disclosed herein may comprise a first convex lens on a side of the VR head-mounted apparatus close to a user's eye when the user wears the VR head-mounted apparatus, a partial-reflection partial-transmission lens located in the VR head-mounted apparatus and on a side of the first convex lens away from the user's eye, and a camera located between the first convex lens and the partial-reflection partial-transmission lens. The partial-reflection partial-transmission lens may be positioned and configured to reflect infrared light from the user's eye to the camera.

In some embodiments, in the aforementioned apparatus, the partial-reflection partial-transmission lens may have a high transmittance for visible light and a low transmittance for infrared light.

In some embodiments, in the aforementioned apparatus, the partial-reflection partial-transmission lens may comprise an infrared dichroic mirror.

In some embodiments, the aforementioned apparatus may further comprise a VR display component, and the camera may be located outside a display area of the VR display component with respect to the first convex lens.

In some embodiments, in the aforementioned apparatus, the partial-reflection partial-transmission lens may have a plate shape. A surface of the partial-reflection partial-transmission lens may be inclined downward, and the camera may be located at a bottom of the VR head-mounted apparatus. A lens of the camera may face obliquely upward. Alternatively, a surface of the partial-reflection partial-transmission lens may be inclined upward, and the camera may be located at a top of the VR head-mounted apparatus. A lens of the camera may face obliquely downward.

In some embodiments, the aforementioned apparatus may further comprise a second convex lens, and the partial-reflection partial-transmission lens may be provided for at least one of the first convex lens and the second convex lens. The partial-reflection partial-transmission lens may have a plate shape. A surface of the partial-reflection partial-transmission lens may be inclined towards the first convex lens and the second lens, and the camera may be located between the first convex lens and the second convex lens.

In some embodiments, the aforementioned apparatus may further comprise a separator located on a side of the first convex lens and the second convex lens away from the user, and located between the first convex lens and the second convex lens. A surface of the partial-reflection partial-transmission lens may have a rectangular shape, with two side edges of the partial-reflection partial-transmission lens in a horizontal direction abutting against the separator and an inner wall of the apparatus, respectively. The camera may be installed on a side surface of the separator.

In some embodiments, the aforementioned apparatus may further comprise an infrared light source located on a side of the first convex lens towards the user for infrared light compensation for the user's eye. The infrared light source may be distributed at a periphery of the first convex lens, and particularly, within a circumscribed rectangle of the first convex lens.

In some embodiments, the aforementioned apparatus may further comprise an apparatus interface electrically connected to an electronic device installed in the apparatus, with the electronic device being configured to play VR display content. The camera and the infrared light source may be connected to the apparatus interface through a data line. Upon receiving a switch control instruction transmitted by the electronic device through the apparatus interface and the data line, the camera and the infrared light source may perform a state switching operation, and the camera may transmit an acquired infrared image to the electronic device through the apparatus interface and the data line.

A second aspect of this invention may direct to a VR apparatus. The VR apparatus may comprise: a first convex lens on a side of the VR apparatus close to a user's eye when the user wears the VR apparatus, a partial-reflection partial-transmission lens having a high transmittance for visible light and a high reflectivity for infrared light and located on a side of the first convex lens away from the user's eye, a camera positioned to receive reflection of the user's eye from the partial-reflection partial-transmission lens, and an infrared light source located on a side of the first convex lens towards the user for infrared light compensation for the user's eye.

In some embodiments, the VR apparatus may further comprise an apparatus interface connected to the camera and the infrared light source, and an electronic device. The electronic device may be electrically connected to the VR apparatus through the apparatus interface, and may be configured to transmit an infrared image of the user's eye to the electronic device.

In some embodiments, in the aforementioned VR apparatus, the electronic device may be a mobile phone or a tablet installed in the VR apparatus.

In some embodiments, in the aforementioned VR apparatus, the partial-reflection partial-transmission lens may comprise an infrared dichroic mirror.

A third aspect of this invention may direct to a VR viewing apparatus. The VR viewing apparatus may comprise a VR head-mounted apparatus, comprising: a first convex lens and a second convex lens on a side of the VR head-mounted apparatus close to eyes of a user when the user wears the VR head-mounted apparatus, a partial-reflection partial-transmission lens having a high transmittance for visible light and a high reflectivity for infrared light and located on a side of at least one of the first convex lens and the second convex lens away from the eyes of the user, a camera positioned to receive reflection of at least one eye of the user from the partial-reflection partial-transmission lens, an infrared light source located on a side of at least one of the first convex lens and the second convex lens towards the user for infrared light compensation for the at least one eye of the user, and an apparatus interface connected to the camera and the infrared light source.

The VR viewing apparatus may further comprise an electronic device electronically connected to the VR head-mount apparatus through the apparatus interface. The camera may be configured to transmit an infrared image of the at least one eye of the user to the electronic device.

In some embodiments, in the aforementioned VR viewing apparatus, the electronic device may be a mobile phone or a tablet installed in the VR head-mounted apparatus.

In some embodiments, in the aforementioned VR viewing apparatus, the partial-reflection partial-transmission lens may comprise an infrared dichroic mirror.

In some embodiments, in the aforementioned VR viewing apparatus, the infrared light source may be distributed at a periphery of the at least one of the first convex lens and the second convex lens.

The VR head-mounted apparatus disclosed in this application comprises an obliquely disposed partial-reflection partial-transmission lens. The partial-reflection partial-transmission lens may reflect an infrared image of an eye of a user to a camera without interfering with the user's viewing of VR display content. By acquiring the infrared image of the eye reflected through the partial-reflection partial-transmission lens, a deviation angle of the camera during the acquisition may be reduced, which results in reduced distortion and improved acquisition accuracy of the infrared image of the eye.

DETAILED DESCRIPTION OF THE EMBODIMENTS

Specific, non-limiting embodiments of the present invention will be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

Using a VR helmet as an example, detail structures of a VR head-mounted apparatus of this application are described below through several embodiments.

Figure 1:
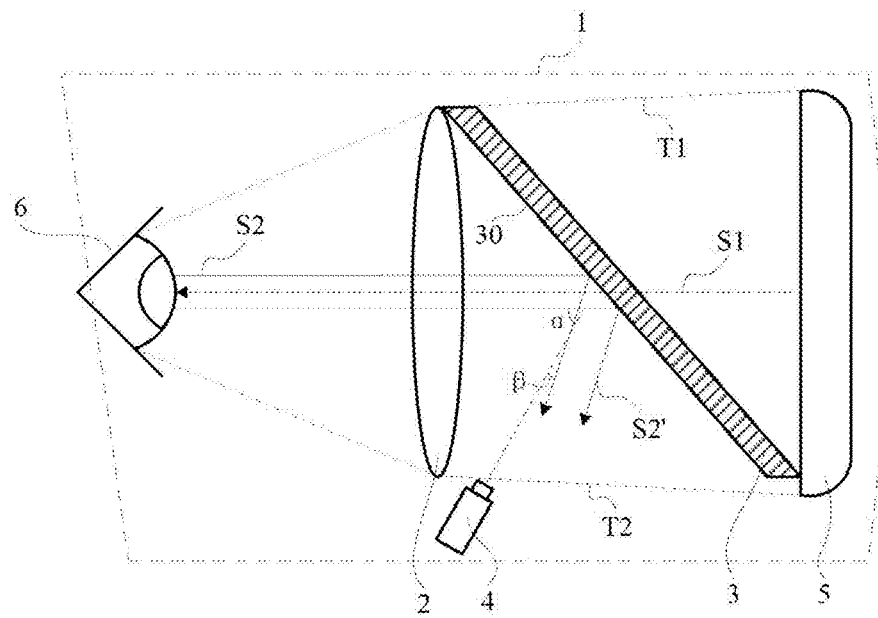
FIG. 1 is a side cross-sectional view of a VR helmet provided by an exemplary embodiment of this application.

FIG. 1 is a side cross-sectional view of a VR helmet provided by an exemplary embodiment of this application. As shown in FIG. 1, the VR head-mounted apparatus 1 (e.g., a VR helmet) may comprise a convex lens 2 and a VR playing component 5. The VR head-mounted apparatus 1 may comprise a partial-reflection partial-transmission lens 3 for reflecting infrared light. The partial-reflection partial-transmission lens 3 may be located on a side of the convex lens away from a user. In other words, the partial-reflection partial-transmission lens 3 may be located between the convex lens 2 and the VR playing component 5. The partial-reflection partial-transmission lens 3 may have a high transmittance (relative to infrared light) for visible light and a low transmittance (relative to visible light) for infrared light. VR display content played by the VR playing component 5 may, in a form of visible light S1, go through the partial-reflection partial-transmission lens 3 almost unaffected. An eye 6 of the user may receive the visible light S1 to view the VR display content. Infrared light S2 emitted from the eye 6 of the user may be mostly, if not completely, reflected by the partial-reflection partial-transmission lens 3. The reflected infrared light S2' may be acquired by a camera 4 positioned between the convex lens 2 and the partial-reflection partial-transmission lens 3, and the reflected infrared light S2' may form an infrared image of the eye 6, so as to achieve functions such as eye tracking and iris recognition. The camera 4 may be an infrared radiation (IR) camera or a red-green-blue (RGB)-IR integrated camera, which is not limited in this application. The camera 4 may include a variable-focus functional component that enables the camera 4 to achieve auto-focusing during image acquisition, thereby performing an infrared image acquisition operation for the eye 6 more quickly and accurately.

In this embodiment, the partial-reflection partial-transmission lens 3 for reflecting infrared light may refer to a lens having a low transmittance for light in infrared spectrum and a high transmittance for light in other spectra (e.g., visible light). The partial-reflection partial-transmission lens 3 may reflect most, if not all, of light in the low-transmittance infrared spectrum, while allowing most, if not all, of light in other spectra (e.g., visible light) to pass through, thereby minimizing the impact of the partial-reflection partial-transmission lens 3 on light in other spectra (e.g., visible light).

For example, the aforementioned partial-reflection partial-transmission lens 3 for reflecting infrared light may be an infrared dichroic mirror, such that visible light may almost completely pass through and infrared light may be almost completely reflected. Specifically, in one case, an infrared reflective film such as a TiO2-Ag—TiO2 infrared reflective film or a ZnS—Ag—ZnS infrared reflective film may be coated on a surface of an optical lens that has a high transmittance to visible light (the visible spectrum may be almost completely transmitted), thereby forming the infrared dichroic mirror. In another example, a lens may be made entirely of the aforementioned infrared reflective film or a similar material to form the infrared dichroic mirror.

More specifically, a surface 30 of the partial-reflection partial-transmission lens 3 may be disposed obliquely with respect to a surface of the convex lens 2, and the partial-reflection partial-transmission lens 3 and the camera 4 may be arranged such that the surface 30 of the partial-reflection partial-transmission lens 3 may reflect the infrared light S2 corresponding to the eye 6 towards the camera 4 to form the reflected infrared light S2'. Assuming that an angle between the camera 4 and the infrared light S2 is α, since the surface 30 of the partial-reflection partial-transmission lens 3 is disposed obliquely with respect to the surface of the convex lens 2, the infrared light S2 may be reflected towards the camera 4 to form the reflected infrared light S2'. An angle β between the camera 4 and the reflected infrared light S2' will be smaller than the aforementioned angle α, thereby reducing the distortion of the infrared image of the eye acquired by the camera 4, and improving the acquisition accuracy for the infrared image of the eye 6. The accuracy and precision of subsequent processing such as iris recognition and eye tracking may be improved.

The inclination angles for the partial-reflection partial-transmission lens 3 and the camera 4 may be determined according to internal space of the VR head-mounted apparatus 1. For example, the inclination angle of the partial-reflection partial-transmission lens 3 may be 45°, and a pointing direction of a lens of the camera 4 may be perpendicular or substantially perpendicular to a surface of the partial-reflection partial-transmission lens 3, which is not limited in this application.

Additionally, since the camera 4 may be located between the convex lens 2 and the VR playing component 5 (i.e., the camera 4 may be located on a propagation line of the visible light S1), an installation position of the camera 4 may be limited to avoid blocking the visible light S1. For example, as shown in FIG. 1, the camera 4 may be located, to the fullest extent possible, further away from a display area (e.g., the display area may be indicated by an upper boundary T1 and a lower boundary T2 shown in FIG. 1) of the VR playing component 5 with respect to the convex lens 2.

Without changing the relative positional relationship among the convex lens 2, the partial-reflection partial-transmission lens 3, the camera 4, and the VR playing component 5, the partial-reflection partial-transmission lens 3 and the camera 4 may have various installation modes in the VR helmet, which will be described in the following examples.

Figure 2:
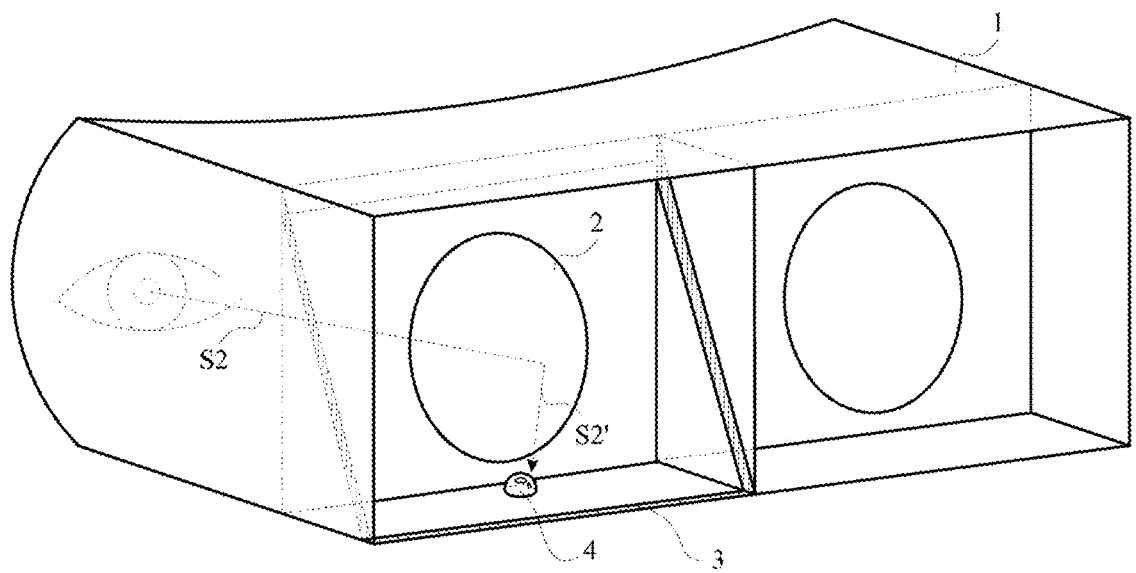
FIG. 2 is a 3-D structural diagram of a VR helmet provided by an exemplary embodiment of this application.

In one embodiment, as shown in FIG. 2, the partial-reflection partial-transmission lens 3 may have a plate shape. A surface of the partial-reflection partial-transmission lens 3 may be inclined obliquely downward with respect to the surface of the convex lens 2. For example, within an inner space between the convex lens 2 and the VR playing component 5, the partial-reflection partial-transmission lens 3 may have its upper edge abut against a top inner side of the inner space, and its lower edge abut against a bottom outer side of the inner space. The camera 4 may be located at a bottom of the VR head-mounted apparatus 1, and the lens of the camera 4 may face obliquely upward to acquire the reflected infrared light S2' reflected by the partial-reflection partial-transmission lens 3. Although in a vertical direction (a top-to-bottom direction in FIG. 1), to avoid blocking the visible light S1, the camera 4 has to be located outside the aforementioned display area and cannot be at the same height as the eye 6, in a horizontal direction (a direction perpendicular to paper in FIG. 1), a horizontal angle between the lens of the camera 4 and the infrared light S2 (or reflected infrared light S2') can be reduced, if not eliminated. For example, as shown in FIG. 2, since the eye 6 of the user is usually located at a middle position of the convex lens 2 in the horizontal direction, the camera 4 may be located at the middle position of the convex lens 2 in the horizontal direction to reduce the distortion of an infrared image of the eye.

Figure 3:
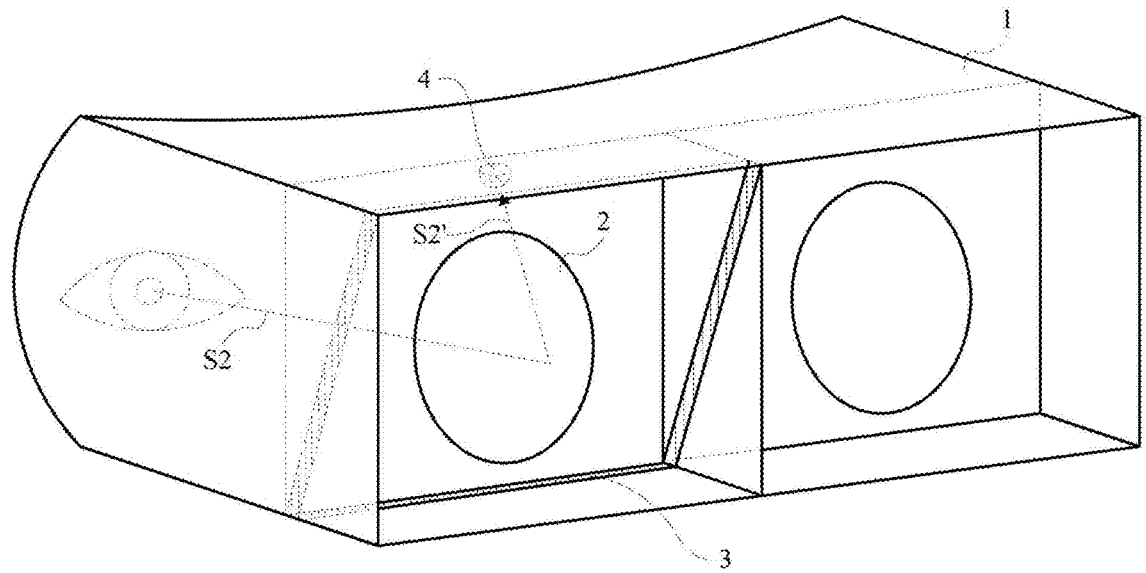
FIG. 3 is a 3-D structural diagram of another VR helmet provided by an exemplary embodiment of this application.

In another embodiment, as shown in FIG. 3, the partial-reflection partial-transmission lens 3 may have a plate shape. A surface of the partial-reflection partial-transmission lens 3 may be inclined obliquely upward with respect to the surface of the convex lens 2. For example, within an inner space between the convex lens 2 and the VR playing component 5, the partial-reflection partial-transmission lens 3 may have its upper edge abut against a top outer side of the inner space, and its lower edge abut against a bottom inner side of the inner space. The camera 4 may be located at a top of the VR head-mounted apparatus 1, and the lens of the camera 4 may face obliquely downward to acquire the reflected infrared light S2' reflected by the partial-reflection partial-transmission lens 3. Then, similarly to the embodiment shown in FIG. 2, the camera 4 may also be located at the middle position of the convex lens 2 in the horizontal direction to reduce, if not eliminate, the horizontal angle with the reflected infrared light S2' to reduce the distortion of an infrared image of the eye.

Figure 4:
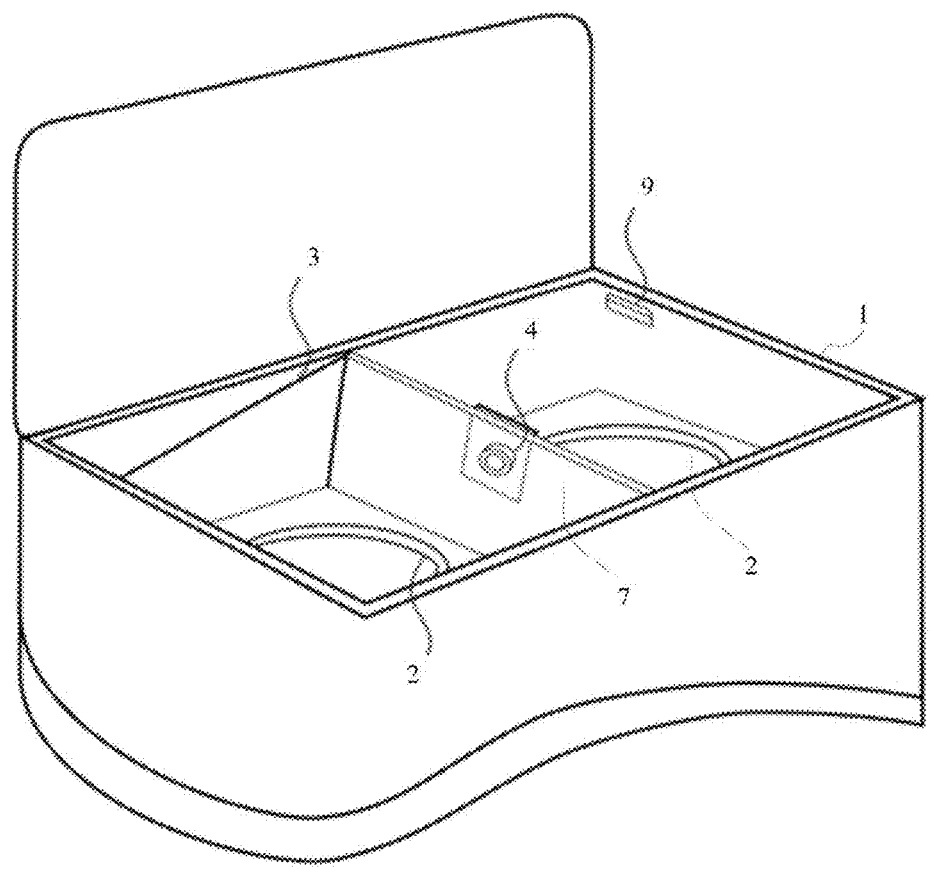
FIG. 4 is a 3-D structural diagram of yet another VR helmet provided by an exemplary embodiment of this application.

In yet another embodiment, as shown in FIG. 4, the VR head-mounted apparatus 1 may comprise two convex lenses 2 (corresponding to two eyes of the user respectively). The partial-reflection partial-transmission lens 3 may be provided for at least one of the two convex lenses 2 for infrared image reflection and acquisition on the corresponding eye of the user. For example, in FIG. 4, the partial-reflection partial-transmission lens 3 may be provided only for a right convex lens 2 corresponding to a right eye of the user, but not for a left convex lens 2 corresponding to a left eye of the user. When the partial-reflection partial-transmission lens 3 has a plate shape, the surface of the partial-reflection partial-transmission lens 3 may be inclined horizontally towards the two convex lenses 2, and the camera 4 may be located between the two convex lenses 2. For example, in FIG. 4, when the partial-reflection partial-transmission lens 3 is provided for the right eye of the user, within an inner space between the right convex lens 2 and the VR playing component 5, the partial-reflection partial-transmission lens 3 may have its right side abut against a right interior of the inner space, and its left side abut against a left exterior of the inner space. That is, the surface of the partial-reflection partial-transmission lens 3 may be inclined leftward, and the lens of the camera 4 may be disposed in a left-to-right orientation to acquire the reflected infrared light S2' reflected by the partial-reflection partial-transmission lens 3.

In some embodiments, the VR head-mounted apparatus 1 may comprise a separator 7. The separator 7 may be located on a side of the two convex lenses 2 away from the user, and located between the two convex lenses 2 in the VR head-mounted apparatus 1. In order to adapt to a cuboid space inside the VR head-mounted apparatus 1, the partial-reflection partial-transmission lens 3 may be a rectangular, and two side edges of the partial-reflection partial-transmission lens 3 in the horizontal direction may abut against the separator 7 and an inner wall of the VR head-mounted apparatus 1, respectively. The camera 4 may be installed on a side surface of the separator 7 and may face the surface of the partial-reflection partial-transmission lens 3.

In the aforementioned embodiment, for the VR helmet to provide the user immersive VR user experience, external light should be avoided as much as possible. Thus, it may be difficult to satisfy the light condition of the camera 4 for eye image acquisition since the interior of the VR head-mounted apparatus 1 may be dark after the user wears the VR helmet. To address this issue, this application further proposes the following technical solutions based on the aforementioned embodiments.

Figure 5:
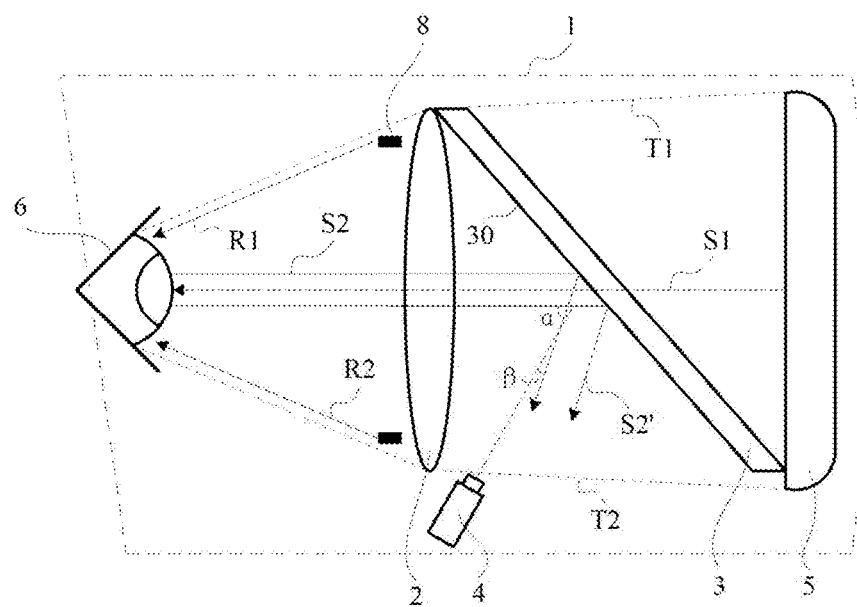
FIG. 5 is a side cross-sectional view of another VR helmet provided by an exemplary embodiment of this application.
Figure 6:
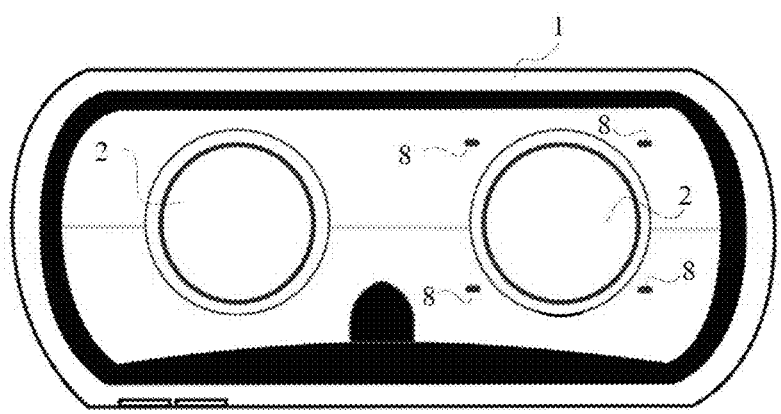
FIG. 6 is a structural diagram of a VR helmet, observed from a wearer's direction, provided by an exemplary embodiment of this application.

In the VR helmet of this application, as shown in FIG. 5, the VR head-mounted apparatus 1 may further comprise an infrared light source 8. The infrared light source 8 may be distributed at a periphery of at least one convex lens 2 (the infrared light source 8 may emit infrared light such as R1 and R2 to the eye 6, as shown in FIG. 5), and provide infrared light compensation for an eye 6 of a user corresponding to the at least one convex lens 2. As shown in FIG. 6, the VR helmet may comprise two convex lenses 2 corresponding to two eyes of the user. The infrared light source 8 may be distributed at a periphery of one single convex lens 2. For example, the infrared light source 8 may be distributed at a periphery of the right convex lens 2, as shown in FIG. 6, to provide infrared light compensation for the right eye of the user. In that case, the infrared light source 8 may not be distributed at a periphery of the left convex lens 2. Certainly, in other embodiments, infrared light sources 8 may be simultaneously distributed at peripheries of the two convex lenses 2 for infrared light compensation for two eyes. Detail implementation is not limited in this application.

In the VR helmet of this embodiment, positions of the infrared light source 8, the camera 4, and the partial-reflection partial-transmission lens 3 may be related to each other. For example, as shown in FIG. 6, to perform eye tracking or iris recognition on the right eye of the user, at least one infrared light source 8 may be disposed at the periphery of the right convex lens 2. Moreover, the partial-reflection partial-transmission lens 3 and the camera 4 may be provided at a side of the right convex lens 2 away from the user for corresponding infrared image acquisition. Similarly, to perform eye tracking or iris recognition on both eyes of the user, infrared light sources 8 may be disposed at the peripheries of the two convex lenses 2 simultaneously, and the partial-reflection partial-transmission lens 3 and the camera 4 may be provided at a side of each of the two convex lenses 2 away from the user for corresponding infrared image acquisition.

Although the embodiment shown in FIG. 6 has four infrared light sources 8 distributed at a periphery of the right convex lens 2, it is only used as an example here. In the VR helmet of this application, one or more infrared light sources 8 may be distributed at a periphery of each convex lens. The number of infrared light sources 8 is not limited in this application. When there exist multiple infrared light sources 8 distributed at a periphery of a convex lens 2 (e.g., as shown in FIG. 6, four infrared light sources 8 are distributed at a periphery of the right convex lens 2), these infrared light sources 8 may be, to the fullest extent possible, uniformly distributed to provide uniform light compensation for the eye 6.

Figure 7:
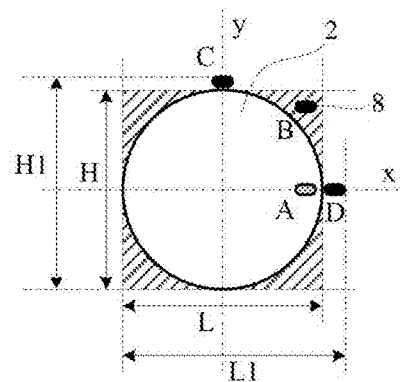
FIG. 7 is a schematic diagram of a positional relationship between an infrared light source and a convex lens provided by an exemplary embodiment of this application.

Additionally, since the VR head-mounted apparatus 1 may comprise the convex lens 2, an external size of the VR head-mounted apparatus 1 may be related to the space occupied by the convex lens 2. For example, as shown in FIG. 7, assuming the convex lens 2 has a length of L in a horizontal direction (i.e., x-axis direction in FIG. 7), and a length of H in a vertical direction (i.e., y-axis direction in FIG. 7, in case the convex lens 2 is a circle, L and H are equal to a diameter length of the circle), the space occupied by the convex lens 2 may be related to values of L and H. That is, the VR head-mounted apparatus 1 may have a length of at least L in the horizontal direction, and a length of at least H in the vertical direction. When the VR head-mounted apparatus 1 has a substantially rectangular parallelepiped shape, the external size of the VR head-mounted apparatus 1 required by the convex lens 2 may be substantially the same as the external size of the VR head-mounted apparatus 1 required by a circumscribed rectangle of the convex lens 2 of the VR head-mounted apparatus 1 (as shown in FIG. 7, the circumscribed rectangle has a horizontal width of L and a vertical height of H).

In one embodiment, as shown in FIG. 7, when an installation position of the infrared light source 8 is located within a circumscribed rectangle of the convex lens 2, to avoid blocking the convex lens 2, the infrared light source 8 should not be located within the convex lens 2 (e.g., point A), and should be located within, for example, a shaded area (e.g., point B) shown in FIG. 7. In this case, an external size of the VR head-mounted apparatus 1 required by the infrared light source 8 may be substantially the same as the external size of the VR head-mounted apparatus 1 required by a circumscribed rectangle of the convex lens 2 (or the convex lens 2 itself). Therefore the infrared light source 8 does not incur any additional space requirement for the VR head-mounted apparatus 1. That helps to control or even reduce the size of the VR head-mounted apparatus 1 and the associated VR helmet, and prevent the VR helmet from becoming too bulky and cumbersome.

In another embodiment, as shown in FIG. 7, the infrared light source 8 may be located at point C, then an overall height of a combination of the infrared light source 8 and the convex lens 2 in the vertical direction may increase from H to H1. That is, an external size of the VR head-mounted apparatus 1 in the vertical direction may increase from H to H1, and the VR helmet may become thicker. Similarly, when the infrared light source 8 is located at point D, an overall width of a combination of the infrared light source 8 and the convex lens 2 in the horizontal direction may increase from L to L1. That is, an external size of the VR head-mounted apparatus 1 in the horizontal direction may increase from L to L1, and the VR helmet may become wider.

Therefore, to the fullest extent possible, the infrared light source 8 can be located within the circumscribed rectangle of the corresponding convex lens 2 to avoid increasing the external size of the VR head-mounted apparatus 1, and to help control the space occupied by the VR helmet.

Figure 8:
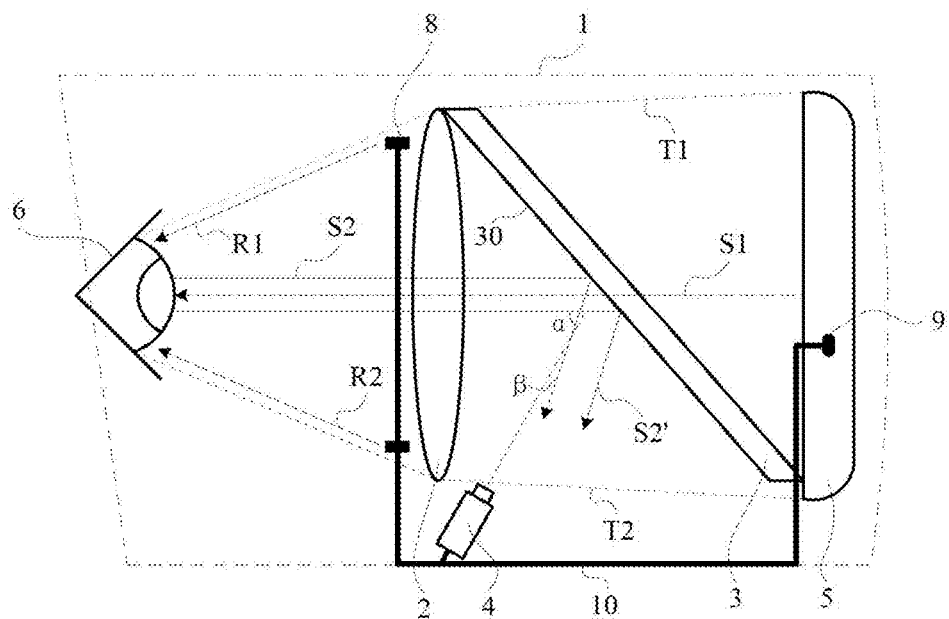
FIG. 8 is a side cross-sectional view of yet another VR helmet provided by an exemplary embodiment of this application.

FIG. 8 is a side cross-sectional view of another VR helmet provided by an exemplary embodiment of this application. As shown in FIG. 8, the VR helmet may be a split-style VR head-mounted apparatus, and the VR head-mounted apparatus 1 of the VR helmet may comprise an apparatus interface 9 electrically connected to an electronic device, such as a mobile phone or a tablet, installed in the VR head-mounted apparatus 1. By using a processor or a graphics card chip, etc. for rendering, and using a screen component for content displaying, the electronic device may work as the VR playing component 5 in the VR head-mounted apparatus 1.

Further, the camera 4 and the infrared light source 8 in the VR head-mounted apparatus 1 may be connected to the apparatus interface 9 through a data line 10, so that when the electronic device connected to the apparatus interface 9 issues a switch control instruction, the camera 4 and the infrared light source 8 may receive the switch control instruction through the apparatus interface 9 and the data line 10, and perform a state switching operation in response to the switch control instruction. In other words, based on the user control to the electronic device or an application program running on the electronic device, the electronic device may send a switch control instruction to the camera 4 and the infrared light source 8, thereby controlling the infrared light source 8 to provide infrared light compensation on the eye 6, and controlling the camera 4 to perform infrared image acquisition on the eye 6. That improves the controllability of infrared light compensation and infrared image acquisition.

In some embodiments, the switch control instruction may be sent to the camera 4 and the infrared light source 8 simultaneously. Alternatively, the switch control instruction may also be sent to the camera 4 or the infrared light source 8 separately. For example, the instruction may separately control the camera 4 to perform infrared image acquisition, and separately control the infrared light source 8 to provide infrared light compensation in case of poor light condition.

Additionally, after the camera 4 completes the infrared image acquisition, if the VR helmet comprises a processing module, the acquired infrared image may be transmitted to the processing module for processing. Alternatively, the camera 4 may transmit, through the apparatus interface 9 and the data line 10, the acquired infrared image to the aforementioned electronic device for processing by the electronic device.

Certainly, the VR head-mounted apparatus of this application may include other types of VR head-mounted apparatuses other than the split-style VR head-mounted apparatus paired with an electronic device such as a mobile phone. In one example, for the split-style VR head-mounted apparatus, the VR head-mounted apparatus may be paired with a PC host, a game console or another external apparatus. Then the VR playing component 5 may be an integrated display component in the VR head-mounted apparatus, and the external apparatus may be used for rendering VR display content. In another example, the VR head-mounted apparatus may be an integrated VR head-mounted apparatus. That is, the VR head-mounted apparatus may be able to play VR display content without resorting to any other external apparatus. The VR playing component 5 may be built-in in the VR head-mounted apparatus, and may have playing functions such as rendering and displaying of VR display content.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

Reference will be made in detail to exemplary embodiments, examples of which are illustrated in the accompanying drawings. The above description may refer to the accompanying drawings in which the same numbers in different drawings represent the same or similar elements unless otherwise represented. The implementations set forth in the following description of exemplary embodiments do not represent all implementations consistent with this application. Instead, they are merely examples of apparatuses and methods consistent with aspects related to this application as recited in the appended claims.

The terms used in this application are merely for the purpose of describing specific embodiments, and are not intended to limit this application. The terms "a", "said" and "the" of singular forms used in this application and the appended claims are also intended to include plural forms, unless otherwise specified in the context clearly. It should also be understood that, the term "and/or" used herein indicates and includes any or all possible combinations of one or more associated listed items.

It should be understood that although the terms such as first, second, and third may be used herein to describe various information, such information should not be limited to these terms. These terms are merely used for distinguishing information of the same type from each other. For example, within the scope of this application, first information may also be referred to as second information, and similarly, second information may also be referred to as first information. Depending on the context, the term "if" as used herein may be interpreted as "when . . . " or "upon . . . " or "in response to determining."

The foregoing descriptions are merely exemplary embodiments of this application, but are not intended to limit this application. Any modification, equivalent replacement, or improvement made without departing from the spirit and principle of this application should fall within the protection scope of this application.

What is claimed is:

1. A virtual reality (VR) head-mounted apparatus, comprising:
   a first convex lens on a side of the VR head-mounted apparatus close to a user's eye when the user wears the VR head-mounted apparatus;
   a partial-reflection partial-transmission lens located in the VR head-mounted apparatus and on a side of the first convex lens away from the user's eye;
   a camera located between the first convex lens and the partial-reflection partial-transmission lens, wherein the partial-reflection partial-transmission lens is positioned and configured to reflect infrared light from the user's eye to the camera; and
   a plurality of infrared light sources located on a side of the first convex lens towards the user for infrared light compensation for the user's eye,
   wherein the plurality of infrared light sources are distributed at a periphery of the first convex lens, and, when viewed along a direction parallel with an optical axis of the first convex lens, are all located within a circumscribed rectangle of the first convex lens and outside the first convex lens, the circumscribed rectangle having a same horizontal width and a same vertical height as those of the first convex lens.

2. The apparatus of claim 1, wherein the partial-reflection partial-transmission lens has a high transmittance for visible light and a low transmittance for infrared light.

3. The apparatus of claim 1, wherein the partial-reflection partial-transmission lens comprises an infrared dichroic mirror.

4. The apparatus of claim 1, further comprising a VR display component, and wherein the camera is located outside a display area of the VR display component with respect to the first convex lens.

5. The apparatus of claim 1, wherein the partial-reflection partial-transmission lens has a plate shape, a surface of the partial-reflection partial-transmission lens is inclined downward, the camera is located at a bottom of the VR head-mounted apparatus, and a lens of the camera faces obliquely upward.

6. The apparatus of claim 1, wherein the partial-reflection partial-transmission lens has a plate shape, a surface of the partial-reflection partial-transmission lens is inclined upward, the camera is located at a top of the VR head-mounted apparatus, and a lens of the camera faces obliquely downward.

7. The apparatus of claim 1, wherein the apparatus further comprises a second convex lens, the partial-reflection partial-transmission lens is provided for at least one of the first convex lens and the second convex lens, and wherein the partial-reflection partial-transmission lens has a plate shape, a surface of the partial-reflection partial-transmission lens is inclined towards the first convex lens and the second convex lens, and the camera is located between the first convex lens and the second convex lens.

8. The apparatus of claim 7, further comprising a separator located on a side of the first convex lens and the second convex lens away from the user and between the first convex lens and the second convex lens, and wherein the surface of the partial-reflection partial-transmission lens has a rectangular shape, two side edges of the partial-reflection partial-transmission lens in a horizontal direction abutting against the separator and an inner wall of the apparatus, respectively, and the camera is installed on a side surface of the separator.

9. The apparatus of claim 1, further comprising:
an apparatus interface electrically connected to an electronic device installed in the apparatus, the electronic device being configured to play VR display content,
wherein the camera and the plurality of infrared light sources are connected to the apparatus interface through a data line, and wherein upon receiving a switch control instruction transmitted by the electronic device through the apparatus interface and the data line, the camera and the plurality of infrared light sources perform a state switching operation, and the camera transmits an acquired infrared image to the electronic device through the apparatus interface and the data line.

10. A virtual reality (VR) apparatus, comprising:
a first convex lens on a side of the VR apparatus close to a user's eye when the user wears the VR apparatus;
a partial-reflection partial-transmission lens having a high transmittance for visible light and a high reflectivity for infrared light and located on a side of the first convex lens away from the user's eye;
a camera positioned to receive reflection of the user's eye from the partial-reflection partial-transmission lens; and
a plurality of infrared light sources located on a side of the first convex lens towards the user for infrared light compensation for the user's eye,
wherein the plurality of infrared light sources are distributed at a periphery of the first convex lens, and, when viewed along a direction parallel with an optical axis of the first convex lens, are all located within a circumscribed rectangle of the first convex lens and outside the first convex lens, the circumscribed rectangle having a same horizontal width and a same vertical height as those of the first convex lens.

11. The VR apparatus of claim 10, further comprising:
an apparatus interface connected to the camera and the infrared light source; and
an electronic device electrically connected to the VR apparatus through the apparatus interface, wherein the camera is configured to transmit an infrared image of the user's eye to the electronic device.

12. The VR apparatus of claim 11, wherein the electronic device is a mobile phone or a tablet installed in the VR apparatus.

13. The VR apparatus of claim 10, wherein the partial-reflection partial-transmission lens comprises an infrared dichroic mirror.

14. A virtual reality (VR) viewing apparatus, comprising:
a VR head-mounted apparatus, comprising:
a first convex lens and a second convex lens on a side of the VR head-mounted apparatus close to eyes of a user when the user wears the VR head-mounted apparatus;
a partial-reflection partial-transmission lens having a high transmittance for visible light and a high reflectivity for infrared light and located on a side of at least one of the first convex lens and the second convex lens away from the eyes of the user;
a camera positioned to receive reflection of at least one eye of the user from the partial-reflection partial-transmission lens;
a plurality of infrared light sources located on a side of at least one of the first convex lens and the second convex lens towards the user for infrared light compensation for the at least one eye of the user, wherein the plurality of infrared light sources are distributed at a periphery of the at least one of the first convex lens and the second convex lens, and, when viewed along a direction parallel with an optical axis of the at least one of the first convex lens and the second convex lens, are located within a circumscribed rectangle of, and outside of, the at least one of the first convex lens and the second convex lens, the circumscribed rectangle having a same horizontal width and a same vertical height as those of the at least one of the first convex lens and the second convex lens; and
an apparatus interface connected to the camera and the infrared light source, and
an electronic device electrically connected to the VR head-mount apparatus through the apparatus interface,
wherein the camera is configured transmit an infrared image of the at least one eye of the user to the electronic device.

15. The VR viewing apparatus of claim 14, wherein the electronic device is a mobile phone or a tablet installed in the VR head-mounted apparatus.

16. The VR viewing apparatus of claim 14, wherein the partial-reflection partial-transmission lens comprises an infrared dichroic mirror.

17. The VR viewing apparatus of claim 14, wherein the partial-reflection partial-transmission lens has a high transmittance for visible light and a low transmittance for infrared light.

18. The VR viewing apparatus of claim 14, wherein the VR head-mounted apparatus further comprises a VR display component, and wherein the camera is located outside a display area of the VR display component with respect to the first convex lens.

19. The VR viewing apparatus of claim 14, wherein the partial-reflection partial-transmission lens has a plate shape, a surface of the partial-reflection partial-transmission lens is inclined upward, the camera is located at a top of the VR head-mounted apparatus, and a lens of the camera faces obliquely downward.

20. The VR viewing apparatus of claim 14, wherein the VR head-mounted apparatus further comprises a separator located on a side of the first convex lens and the second convex lens away from the user and between the first convex lens and the second convex lens, and wherein a surface of the partial-reflection partial-transmission lens has a rectangular shape, two side edges of the partial-reflection partial-transmission lens in a horizontal direction abutting against the separator and an inner wall of the VR head-mounted apparatus, respectively, and the camera is installed on a side surface of the separator.

\* \* \* \* \*